No. 895,859. PATENTED AUG. 11, 1908.
O. L. HEROD.
AUTOMATIC BRAKE FOR VEHICLE WHEELS.
APPLICATION FILED MAR. 21, 1908.

2 SHEETS—SHEET 1.

Witnesses:

Inventor:
Omar L. Herod

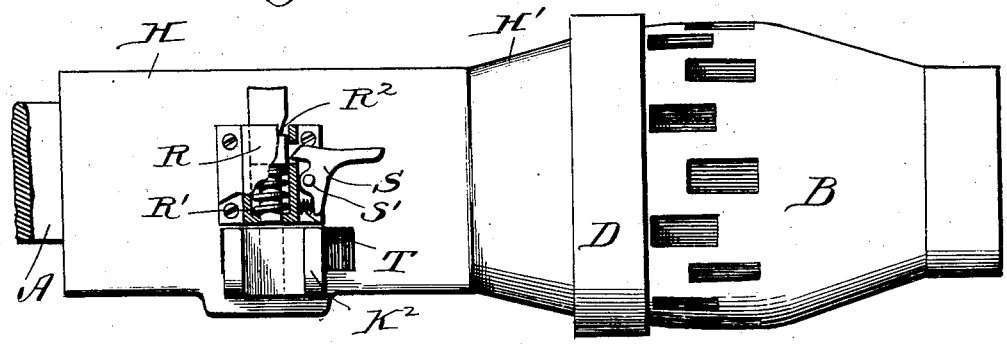
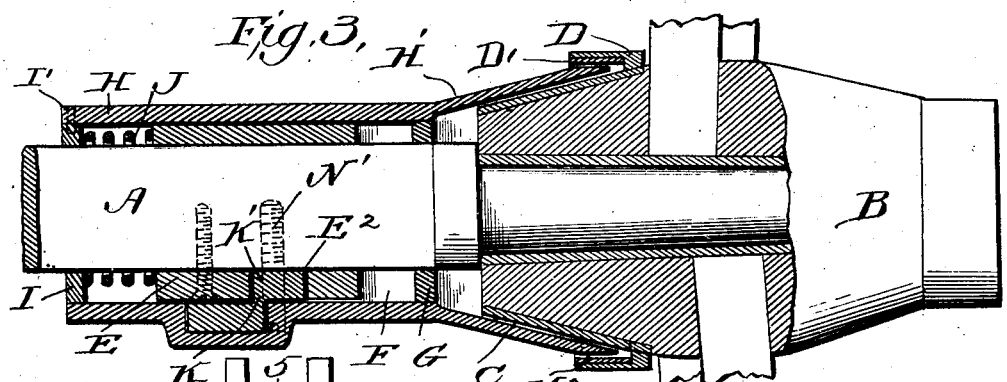
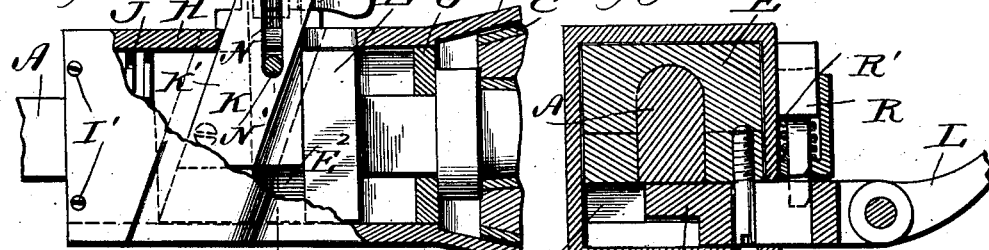
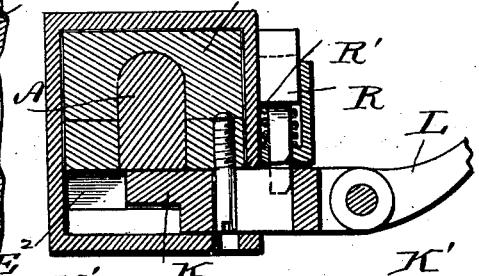
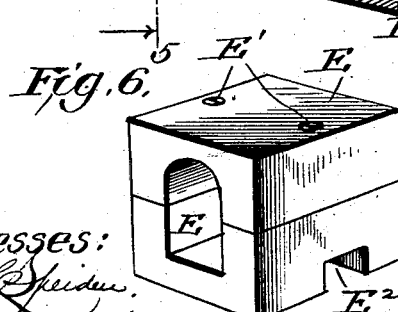

UNITED STATES PATENT OFFICE.

OMAR L. HEROD, OF DUNKARD, PENNSYLVANIA.

AUTOMATIC BRAKE FOR VEHICLE-WHEELS.

No. 895,859.

Specification of Letters Patent.

Patented Aug. 11, 1908.

Application filed March 21, 1908. Serial No. 422,512.

*To all whom it may concern:*

Be it known that I, OMAR L. HEROD, a citizen of the United States, residing at Dunkard, in the county of Greene and State of Pennsylvania, have invented certain new and useful Improvements in Automatic Brakes for Vehicle-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic brakes for vehicles and comprises various details of construction, combinations and arrangements of parts which will be hereinafter fully described and then specifically defined in the appended claims.

My invention is illustrated in the accompanying drawings, in which:—

Figure 1:
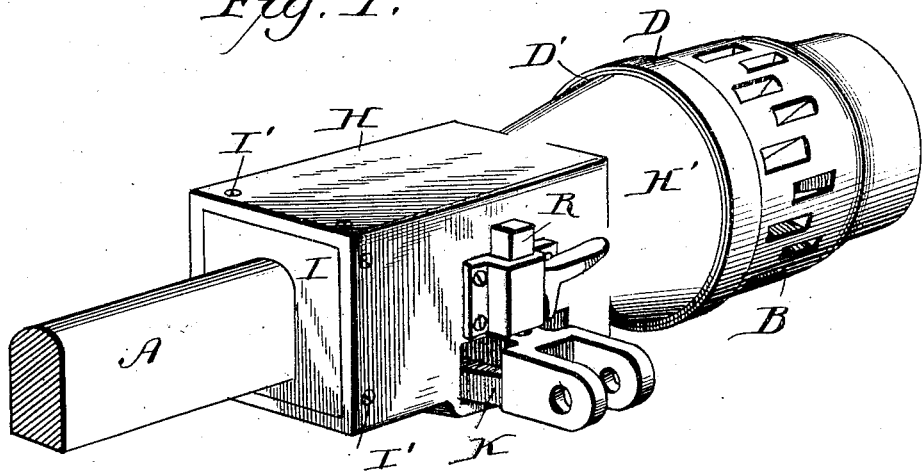
Figure 8:
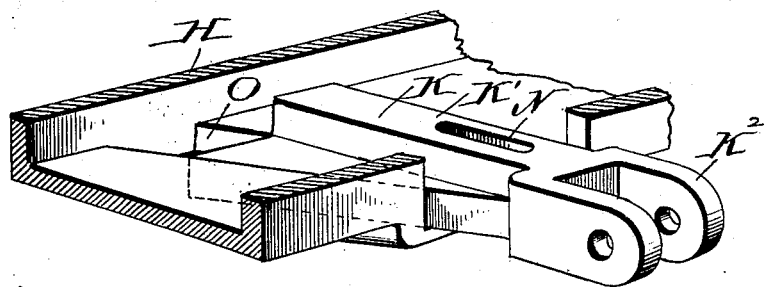
Figure 9:
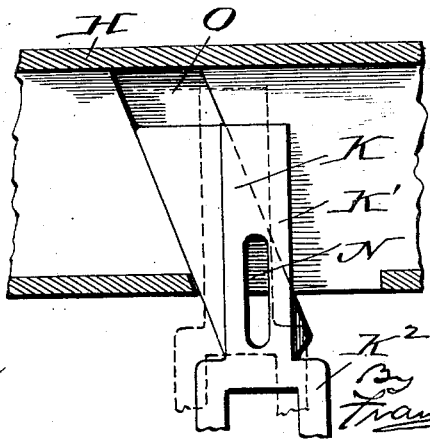

Figure 1 is a perspective view of the invention. Fig. 2 is a front elevation. Fig. 3 is a longitudinal view through the apparatus. Fig. 4 is a bottom plan view partially in transverse section. Fig. 5 is a sectional view on line 5—5 of Fig. 4. Fig. 6 is a detail perspective view of the boxing forming a part of the apparatus. Fig. 7 is a detail view of a sliding member to which the shaft or thill is adapted to be connected. Fig. 8 is a detail perspective view showing the manner in which the slide attached to the thills is mounted within its boxing, and Fig. 9 is a top plan view of the details shown in Fig. 7.

Reference now being had to the details of the drawings by letter, A designates the axle of a vehicle and B the hub of a wheel. Fixed to said hub adjacent to the spokes is a metallic dust band D, and D' designates a lining therefor, preferably of felt. A suitable covering of leather or other fabric, designated by letter C, is placed about the circumference of the inner hub upon the inclined surface thereof intermediate the spokes and the inner end of the hub forming a frictional surface against which a movable brake boxing is adapted to bear.

Fixed to the axle A is a casing E, made up preferably of two sections, held together and to the axle by means of screws $E^7$ and said casing has a transverse groove $E^2$ formed in the bottom thereof. Said casing bears against one edge of the shoulder F upon the axle and against which shoulder a suitable washer G bears, made preferably of felt and provided for the purpose of keeping any grease or oil from passing by the shoulder of the axle. Mounted to have a sliding movement over said casing and axle is a boxing H having a flaring end H' designed to telescope over the circumference of the inner end of the hub, as shown clearly in Fig. 3 of the drawings. The outer end of the flaring portion H' of said boxing has a cylindrical portion $H^2$ adapted to telescope within the dust band D.

Fitted within the inner end of the boxing H is a plate I, through which the axle passes, said plate being held in place by means of screws I' or other suitable fastening means, and J designates a coiled spring which is interposed between the casing E and said plate I and serves to normally hold the boxing at its farthest throw away from the hub of the wheel, so that the frictional brake surfaces will be out of contact with each other.

Referring to Fig. 7 of the drawings will be seen a sliding brake actuating member, designated by letter K, having a raised portion K' and a clevis $K^2$ at one end thereof which is apertured to receive a thill or shaft L which is pivotally connected thereto, as shown in Fig. 5 of the drawings. Said member K has an elongated slot N formed therein through which a pin N' passes and which pin is held in said boxing. Upon reference to the drawings, it will be noted that the boxing H has a transverse recess O formed in the bottom thereof, said recess being diagonally disposed, as shown clearly in Figs. 4 and 8 of the drawings, and adapted to receive the diagonally disposed shank portion of the member K. When the member K is adjusted in place with its diagonal portion inserted in the recess O, the raised portion K' will be seated in the transverse grooved portion $E^2$ of the casing E so that, when a longitudinal movement is imparted to the member K, it will cause the boxing to move in one direction or the other either toward or away from the hub of the wheel.

Mounted within said boxing is a spring-pressed pin R designed to be held normally by means of the spring R' out of the slot N, as shown in Fig. 5 of the drawings, to allow the brakes to be automatically set without any interference by said pin. Said pin has a notch R² formed in the edge thereof, and S designates a pawl pivotally mounted upon the pin S'. A spring T is adapted to bear against said pawl to normally hold the same so that its inner end will be out of the slot in said boxing to allow the member K to move freely longitudinally.

In operation, in the event of it being desired to apply the brake, it may be done automatically by an inward thrust upon the member K incident to a backward pressure upon the thill or shaft. The member K, as it is moved backward with the raised portion K' moving at right angles to the length of the axle, will cause the boxing to be moved toward the hub by reason of the diagonally disposed portion of the member K moving in the diagonal recess O in said boxing. As the boxing is moved toward the hub, the inner end surface of the flaring end H' of the boxing will contact with the hub or the covering C thereon frictionally. As the boxing H moves toward the hub, the spring J will be put under compression and, when the inner pressure is relieved from the member K, said spring J will have a tendency to return the boxing to its normal position. Any outer longitudinal movement to the member K will coöperate with the spring J to release the brake as will be readily understood.

In the event of it being desired to set the apparatus so that the brake will not automatically apply, the operator may, by depressing the pin R with any instrument, such as the butt of a whip, cause the end of the pin to pass into the elongated slot N so that, when there is a tendency to apply the brake by an inward thrust of the member K, the outer end of the slot N will contact with said pin and prevent a further rearward movement to said member. The pin R will be held in its downward position by means of the pawl S engaging a notch R² in the pin. When it is desired to release the pin, the operator may press, with the butt of the whip or other instrument, upon the laterally projecting portion of the pawl S, releasing the pawl from the notch and allowing the spring R' to throw the pin out of the slot N, thereby allowing the brake to be applied by the inner throw of the member K to its limit.

From the foregoing, it will be noted that, by the provision of the apparatus as shown and described, a simple and efficient brake mechanism is afforded for vehicle wheels, which brake mechanism will be automatic in its action and conveniently regulated by the operator in the manner shown and described.

What I claim to be new is:—

1. A brake mechanism comprising, in combination with an axle and hub of a wheel, a boxing movably mounted upon the axle and designed to frictionally engage the hub of the wheel, a shaft engaging member held upon the axle and having a diagonally disposed portion designed to engage said boxing and cause the latter to move toward or away from the hub of the wheel, as set forth.

2. A brake mechanism comprising, in combination with an axle and hub of a wheel, a boxing movably mounted upon the axle and designed to frictionally engage the hub of the wheel, a shaft engaging member held upon the axle, said boxing having a diagonally disposed recess adapted to receive a diagonally disposed portion of said member for imparting a movement of said boxing toward or away from the hub of a wheel, as set forth.

3. An automatic brake mechanism for vehicle wheels comprising, in combination with an axle and hub of a wheel, a boxing movably mounted upon the axle adapted to frictionally engage the hub, a casing mounted upon the axle and having a transverse recess therein, a shaft-engaging member having a portion thereof adapted to have a longitudinal play in said recess, said member also adapted to be seated in a diagonally disposed recess in the inner wall of said boxing whereby, as the shaft-engaging member is moved longitudinally, the boxing may be moved toward or from the hub of a wheel, as set forth.

4. An automatic brake mechanism for vehicle wheels comprising, in combination with an axle and hub of a wheel, a boxing movably mounted upon the axle adapted to frictionally engage the hub, a casing mounted upon the axle and having a transverse recess therein, a shaft-engaging member having a portion thereof adapted to have a longitudinal play in said recess, said member also adapted to be seated in a diagonally disposed recess in the inner wall of said boxing, an apertured plate in the inner end of said boxing, and a spring bearing between said plate and casing, as set forth.

5. In combination with an axle and hub thereon, a casing fixed to the axle and having a transverse groove therein, a longitudinally movable boxing mounted upon said casing and having a flaring end adjacent to said hub, the bottom of the recess in said boxing having a diagonally disposed recess, a shaft-engaging member having a raised portion guided in the transverse recess in said casing, and a diagonally disposed portion movably held within the recess in said boxing, said member having an elongated slot, a spring-pressed pin mounted upon the boxing and adapted to be moved within said slot to limit the throw of said member, as set forth.

6. In combination with an axle and hub thereon, a casing fixed to the axle and having a transverse groove therein, a longitudinally movable boxing mounted upon said casing and having a flaring end adjacent to said hub, the bottom of the recess in said boxing having a diagonally disposed recess, a shaft-engaging member having a raised portion guided in the transverse recess in said casing, and a diagonally disposed portion movably held within the recess in said boxing, said member having an elongated slot, a spring-pressed pin mounted upon the boxing and adapted to be moved within said slot to limit the throw of said member, and a pawl pivotally mounted upon the boxing and adapted to engage notches in said pin, as set forth.

In testimony whereof I hereunto affix my signature in the presence of two witnesses.

OMAR L. HEROD.

Witnesses:
OLIVER HALFIN,
JOHN N. HEROD.